United States Patent

Busse et al.

[15] 3,682,322
[45] Aug. 8, 1972

[54] CLARIFYING APPARATUS
[72] Inventors: Oswald Busse; Hugo Klesper, both of Michelbach, Germany
[73] Assignee: Passavant-Werke, Hutte, Germany
[22] Filed: May 22, 1970
[21] Appl. No.: 39,744

[30] Foreign Application Priority Data
May 28, 1969 Germany..........P 19 27 179.5

[52] U.S. Cl..................................210/530, 210/523
[51] Int. Cl. ...........................................B01d 12/00
[58] Field of Search.......................210/520, 528, 530

[56] References Cited

UNITED STATES PATENTS

| | | | |
|---|---|---|---|
| 2,673,181 | 3/1954 | Hughes | 210/520 X |
| 2,854,146 | 9/1958 | Nebolsine et al. | 210/528 X |
| 2,427,091 | 9/1947 | Durdiiy | 210/530 |
| 3,067,878 | 12/1962 | Genter et al. | 210/528 X |
| 3,410,413 | 11/1968 | Fechter | 210/530 X |

*Primary Examiner*—Frank W. Miga
*Attorney*—Larson, Taylor and Hinds

[57] ABSTRACT

The invention relates to clarifying apparatus, such as settling tanks, provided with a bridge member which rotates in a horizontal plane above the suspension of solids being treated in the tank. The tank is free of any central supporting column for the bridge member and the bridge is supported at least at one end by the outer wall of the tank. A bridge support member, rigid with the tank, extends over the tank above the rotatable bridge member and provides a central pivot for rotation of the bridge member. The bridge support member may extend diametrically across the tank and may support the bridge member.

5 Claims, 4 Drawing Figures

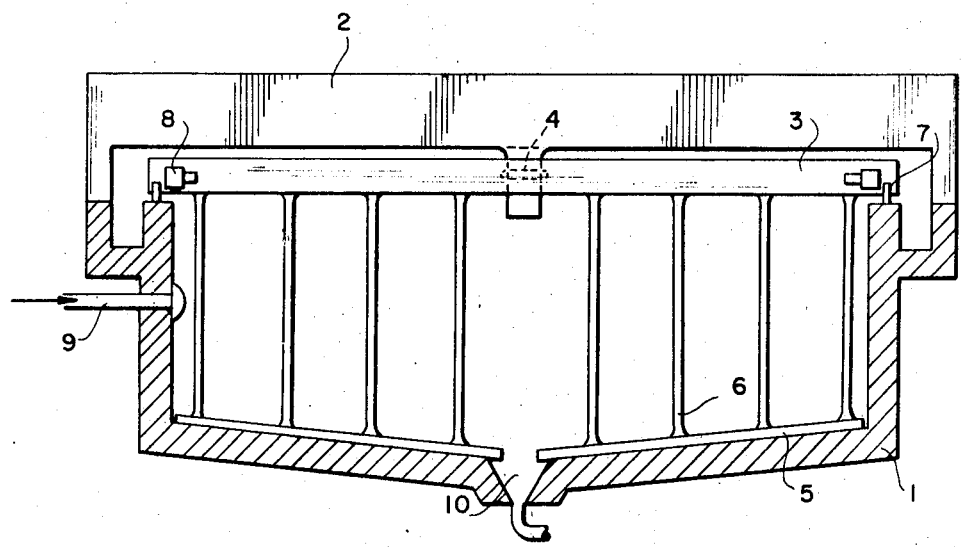
FIG. 1
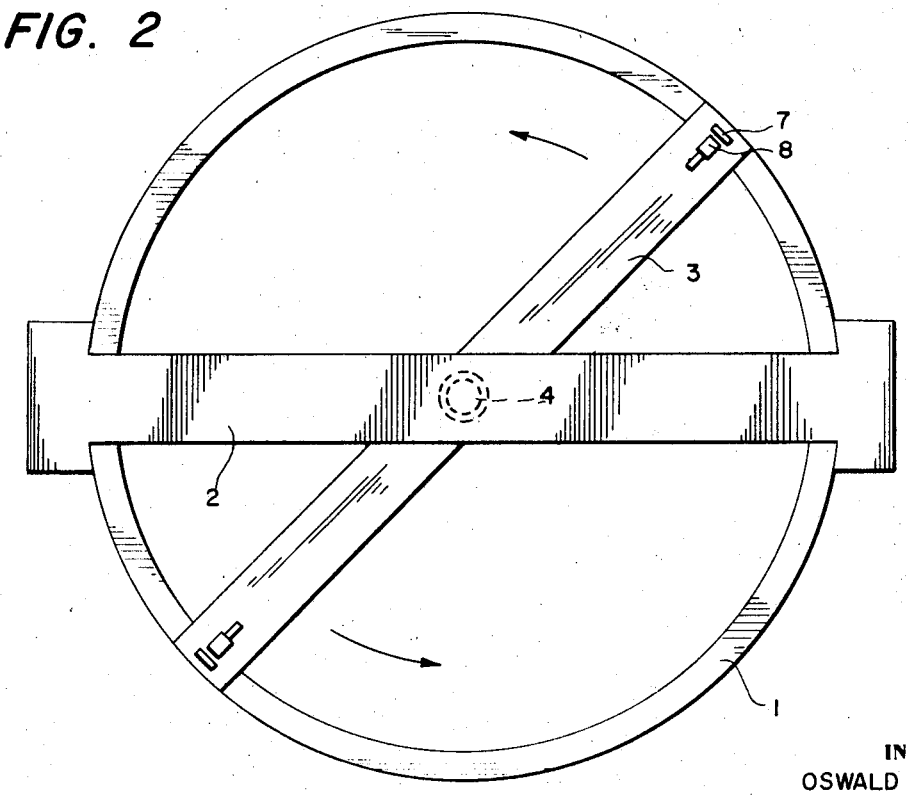
INVENTORS
OSWALD BUSSE
ERWIN KLESPER
BY Larson and Taylor
ATTORNEYS

INVENTORS
OSWALD BUSSE
ERWIN KLESPER 3,682,322

CLARIFYING APPARATUS

BACKGROUND OF THE INVENTION

The invention relates to a traveling carrying structure in circular clarifiers for treating liquid or viscous matter. In another aspect the invention relates to settling tanks or sludge thickener tanks, at least one end of the carrying structure being movably supported on the tank crown.

Such bridge-type carrying structures, for example in clarifiers and sludge thickener tanks, serve as a support for aeration equipment, stirring means, bottom sludge scrapers or skimming means etc, submerged by liquid or sludge in the tank and moved by the traveling motion of the structure across the tank. According to common practice, a bridge is supported on a center post in the middle of the clarifier, the bridge spanning the tank either radially (unilateral arrangement) or diametrically (bilateral arrangement). On the other end, the bridge is supported on wheels traveling on the tank crown. Driving means usually is provided at the center support well.

Apart from the expense involved, the installation of a center well in this type of tank frequently causes several disadvantages. Therefore bridges have been developed which span the tank without being supported on a center well and with both their ends supported on the tank crown and traveling thereon, driving means also being provided on the tank crown. The primary advantage of this method is that it is much easier to move the bottom sludge into a centrally arranged sludge hopper from where it is withdrawn. Also, scum removal is simplified by this arrangement. On the other hand, exact centering is rendered extremely difficult in a setup of this type with the bridge being supported on the tank crown only. Particularly in large diameter tanks, such bridges are prone to canting and jamming especially if the bridge is exposed to heavy forces such as caused by equipment attached to it like bottom scrapers, stirring means, etc.

BRIEF SUMMARY OF THE PRESENT INVENTION

It is an object of this invention to improve the centering and balancing of such a carrying structure without providing a center well. This and other objects which will be apparent to those having ordinary skill in the art are achieved according to the invention by providing a carrying structure of the said type guided by overhead centering means located in the middle of the tank. Thus, the moveable supports of the carrying structure on the tank crown no longer serve as centering means and may be of a comparatively simple construction. The carrying structure, being balanced by suitable overhead centering means such as a spigot, will not become jammed. According to the invention, apparatus for clarifying a suspension of solids in a liquid comprises a cylindrical settling tank, the longitudinal axis of said cylinder being vertical, inlet means for introducing a suspension of solids to be clarified into said tank, first outlet means for removing clarified liquid from the upper portion of said tank, second outlet means for removing thickened suspension from the lower portion of said tank, bridge support means rigid with said tank and extending over the upper portion thereof, bridge pivot means located on said bridge support means at the longitudinal axis of said cylindrical tank, a bridge member located between said bridge support means and the upper portion of said tank and mounted for rotation in a horizontal plane about said pivot means, said bridge being supported at least at one end thereof by the outer wall of said cylindrical tank, said tank being free of a central support for said bridge.

DETAILED DESCRIPTION

Specific embodiments of the invention will be described in the following detailed description including the drawings in which:

FIG. 1 is a sectional elevation of clarifying apparatus according to the invention;

FIG. 2 is a plan view of the apparatus of FIG. 1;

Figure 3:
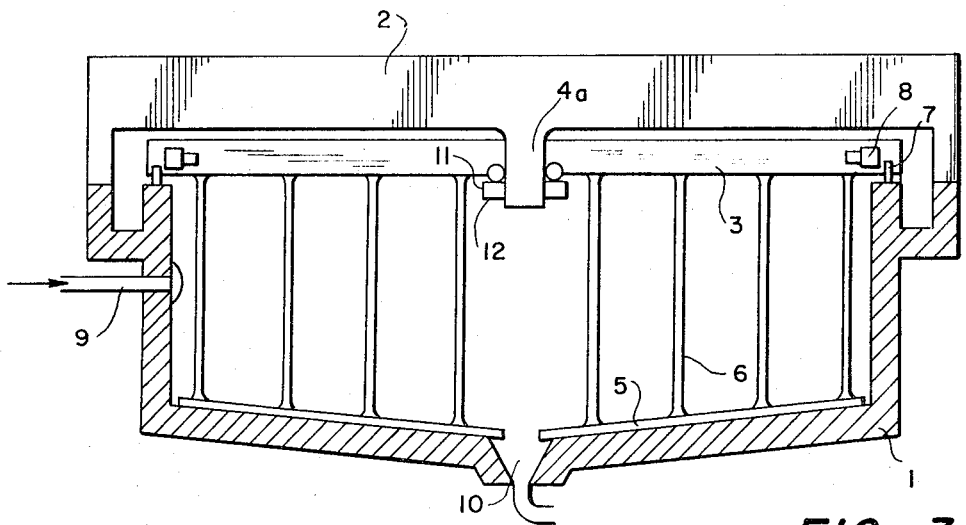
FIG. 3 is a sectional elevation of an alternative form of clarifying apparatus according to the invention.

In a preferred embodiment, the carrying structure is supported with at least one wheel comprising driving means on the tank crown. Thus, while the centering means is provided in the tank center, the drive stays at the periphery of the tank where a lesser driving torque is required. A central drive would be about 50 percent more expensive than a peripheral drive.

The centering means preferably is connected to the tank periphery by at least one supporting arm preferably via a stationary bridge diametrically spanning the tank. As this bridge is located above the traveling carrying means, it does not interfere with the operation of the latter.

As a further improvement to the invention, the bridge support member is so dimensioned as to carry a part of the weight of the traveling carrying structure, so that the centering means also serves as supporting means for the traveling carrying structure. Thus, the carrying structure and its movable supports on the tank crown can be of less heavy construction.

With reference to FIG. 1, a thickening tank 1 is diametrically spanned by a stationary bridge support member 2 which is rigid with the tank. Beneath this stationary bridge support member there is a carrying structure in the form of a traveling bridge 3 movably supported on the tank crown and centered by a spigot 4 which is supported by the stationary bridge support member 2. The traveling structure carries the bottom scraper blades 5, the remaining arms 6 of which are constructed as stirring rods agitating and thickening the sludge.

The wheels 7 on which the traveling structure is supported on the tank crown are equipped with driving means 8. These drives can be made to operate with a much lesser driving torque than if the drive were located in the center of the tank.

Untreated sludge enters the tank through inlet 9. The floor of the tank is conically sloped inwardly towards a funnel-shaped sludge sump 10 which receives the thickened sludge collected by the sludge scraper 5. Conventional outlet means is provided for removal of thickened sludge from the bottom of the tank and for removal of clarified liquid from the top thereof.

Figure 4:
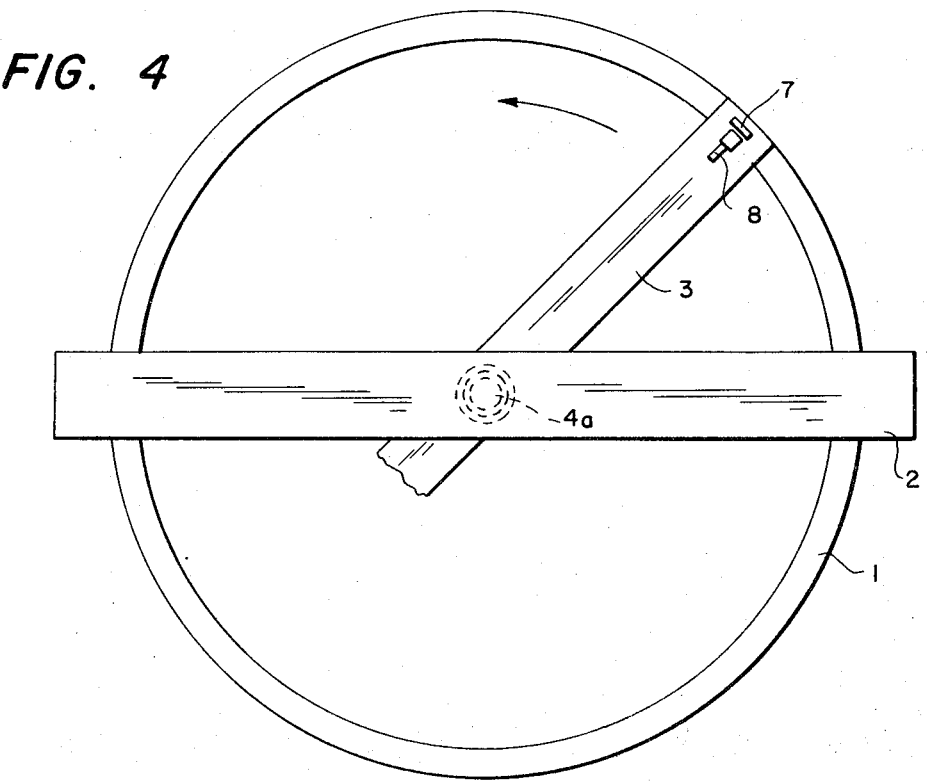
FIG. 4 is a plan view of the apparatus of FIG. 3.

The thickening tank shown in FIGS. 3 and 4 is similar with that shown in FIGS. 1 and 2, corresponding parts having the same numbers. The only difference is that the spigot 4a supported on the stationary bridge 2 is equipped with a journal bearing which carries part of the load of the weight of the traveling carrying structure 3. This support comprises the ball bearing 11 which is mounted on flange 12 provided on the spigot 4a.

What is claimed is:

1. Apparatus for clarifying a suspension of solids in a liquid comprising: a cylindrical settling tank; the longitudinal axis of said cylinder being vertical, inlet means for introducing a suspension of solids to be clarified into said tank; first outlet means for removing clarified liquid from the upper portion of said tank; second outlet means for removing thickened suspension from the lower portion of said tank; bridge support means comprising a rigid member fixedly secured to opposite sides of said tank and extending diametrically over the upper portion thereof such that said member passes through said longitudinal axis; bridge pivot support and guide means located on said bridge support means at the longitudinal axis of said cylindrical tank; a bridge member located between said bridge support means and the upper portion of said tank and supportably mounted on said pivot support and guide means for rotation in a horizontal plane about said longitudinal axis, said bridge member extending radially outward from said pivot means to the periphery of said cylindrical tank and being supported by said pivot means and being guided thereby for rotations thereabout to maintain said bridge member in said radially extending position; outer supporting means adjacent said tank periphery for supporting said bridge member by the outer wall of said cylindrical tank, said bridge member being supported and guided by said bridge pivot support means and said outer supporting means; and rotating means for applying a rotation force to an outer end of said bridge member to rotate said bridge member about said pivot means.

2. Apparatus according to claim 1 wherein said bridge member extends across the full width of the tank and includes supporting means adjacent both ends for supporting said bridge member by the outer wall of said cylindrical tank.

3. Apparatus according to claim 1 further including agitator means and agitator support means on said bridge and extending downwardly into said tank.

4. Apparatus according to claim 3 wherein said agitator means comprises scraper means for moving thickened suspension at the bottom portion of said tank.

5. Apparatus according to claim 1 wherein the floor of said tank is conically inclined downwardly towards a centrally located sump.

* * * * *